(12) United States Patent
Onno et al.

(10) Patent No.: US 8,341,426 B2
(45) Date of Patent: Dec. 25, 2012

(54) METHODS AND DEVICES FOR INSTRUCTION LEVEL SOFTWARE ENCRYPTION

(75) Inventors: Stéphane Onno, Saint-Gregoire (FR); Mohamed Karroumi, Rennes (FR); Antoine Monsifrot, Rennes (FR)

(73) Assignee: Thomson Licensing (FR)

( * ) Notice: Subject to any disclaimer, the term of this patent is extended or adjusted under 35 U.S.C. 154(b) by 340 days.

(21) Appl. No.: 12/653,224

(22) Filed: Dec. 10, 2009

(65) Prior Publication Data
US 2010/0153745 A1 Jun. 17, 2010

(30) Foreign Application Priority Data
Dec. 15, 2008 (EP) ..................... 08305946

(51) Int. Cl.
*G06F 12/14* (2006.01)
(52) U.S. Cl. ....................................... 713/190
(58) Field of Classification Search ................... 713/190
See application file for complete search history.

(56) References Cited

U.S. PATENT DOCUMENTS

| 4,562,305 | A | 12/1985 | Gaffney, Jr. | |
|---|---|---|---|---|
| 6,333,983 | B1 * | 12/2001 | Enichen et al. | 380/273 |
| 6,345,359 | B1 | 2/2002 | Bianco | |
| 6,971,022 | B1 * | 11/2005 | Katta et al. | 713/193 |
| 7,136,488 | B2 * | 11/2006 | Hashimoto et al. | 380/277 |
| 2010/0131758 | A1 * | 5/2010 | Ben-Natan | 713/166 |

FOREIGN PATENT DOCUMENTS

| EP | 0 908 810 A2 | 4/1999 |
|---|---|---|
| JP | 10055273 | 2/1998 |
| JP | 2004246637 | 9/2004 |
| JP | 2005050116 | 2/2005 |
| JP | 2006227777 | 8/2006 |
| JP | 2009-169489 | * 7/2009 |

OTHER PUBLICATIONS

Search Report dated May 20, 2009.

* cited by examiner

*Primary Examiner* — Cordelia Zecher
(74) *Attorney, Agent, or Firm* — Jack Schwartz and Associates, PLLC

(57) ABSTRACT

A method of encrypting compiled computer code instructions to be decrypted instruction by instruction during execution. The computer code instructions are encrypted using a chaining mode so that an encrypted instruction depends on the values of the instruction, the value of the preceding instruction and a pseudo-random number. As it may happen that the instruction can be arrived at from more than one preceding instruction, at least one of the preceding instructions is associated with a random number compensator for use during decryption of the encrypted instruction, so that the decryption of the encrypted instruction yields the same result regardless of which the preceding instruction was. Also provided are an encryption device, a decryption device and method, and a digital support medium storing encrypted compiled computer code instructions.

12 Claims, 3 Drawing Sheets

METHODS AND DEVICES FOR INSTRUCTION LEVEL SOFTWARE ENCRYPTION

This application claims the benefit, under 35 U.S.C. §119, of European Patent Application No. 08305946.9 filed 15 Dec. 2008.

FIELD OF THE INVENTION

The present invention relates generally to software, and in particular to encryption of software and its decryption and execution in a processor.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

It has long been known in the art, e.g. in U.S. Pat. No. 5,386,469 and U.S. Pat. No. 6,345,359, to protect software code by encryption and to decrypt it instruction by instruction only when it is to be executed. A drawback of these systems is that it is relatively easy for hackers to modify instructions to see what happens.

In order to overcome this drawback, US 2005/108507 proposes to scramble the basic blocks of the code and ensure the integrity by generating a signature. A drawback of this solution is that on a hacked system that does not care about the integrity, it is still possible to substitute instructions when trying to hack the system.

It will therefore be appreciated that there is a need for a software encryption solution that overcomes at least some of the drawbacks of the prior art. This invention provides such a solution.

SUMMARY OF THE INVENTION

In a first aspect, the invention is directed to a method of encrypting a set of compiled computer code instructions so as to obtain an encrypted set of compiled computer code instructions intended to be decrypted instruction by instruction during execution. The set of compiled computer code instructions comprises a plurality of branch instructions and a label instruction, wherein execution of the set of compiled computer code instructions may continue from each of the plurality of branch instructions directly to the label instruction. The label instruction is encrypted using a chained encryption function so that the encrypted label instruction depends on at least the values of the label instruction and the value of a chosen one of the plurality of branch instructions; and each of the at least one branch instruction other than the chosen one of the plurality of branch instructions is associated with a compensator value to be used to adjust decryption of the encrypted label instruction so that it yields the same result during execution regardless of which of the plurality of branch instructions is executed immediately before the label instruction.

In a first preferred embodiment, the encryption of the label instruction is further dependent on a pseudo-random random number associated with the label instruction.

In a second preferred embodiment, the pseudo-random number is generated as a function of a code key and an offset of the instruction for which the pseudo-random number is generated.

In a third preferred embodiment, the values of the label instruction and of the chosen one of the plurality of branch instructions are the values of the respective opcode parts.

In a fourth preferred embodiment, the encryption is performed by XOR-ing the values of the label instruction and the value of a chosen one of the plurality of branch instructions.

In a second aspect, the invention is directed to a method of decrypting a set of compiled computer code instructions encrypted using a chained encryption function. During execution of the compiled computer code instructions, a compensator value for an executed function and a subsequent encrypted function are obtained, the subsequent encrypted function following the executed function during the execution of the compiled computer code instructions; a pseudo-random number for the subsequent encrypted function is obtained; and the subsequent encrypted instruction is decrypted using a decryption function corresponding to the chained encryption function, the decryption function generating a subsequent function from at least the subsequent encrypted instruction, the executed function, the pseudo-random number, and the compensator value.

In a first preferred embodiment, the pseudo-random number is generated as a function of a code key and an offset of the subsequent encrypted function.

In a second preferred embodiment, an encrypted function comprises an encrypted opcode and unencrypted parameters, if any, and only the opcode parts of the executed function and the subsequent encrypted function are used for the decryption.

In a third preferred embodiment, the decryption is performed by XOR-ing the values of the subsequent encrypted instruction, the executed function, the pseudo-random number, and the compensator value.

In a third aspect, the invention is directed to a device for encryption of a set of compiled computer code instructions so as to obtain an encrypted set of compiled computer code instructions intended to be decrypted instruction by instruction during execution. The set of compiled computer code instructions comprises a plurality of branch instructions and a label instruction, wherein execution of the set of compiled computer code instructions may continue from each of the plurality of branch instructions directly to the label instruction. The device comprises a processor adapted to encrypt the label instruction using a chained encryption function so that the encrypted label instruction depends on at least the values of the label instruction and the value of a chosen one of the plurality of branch instructions; and associate each of the at least one branch instruction other than the chosen one of the plurality of branch instructions with a compensator value to be used to adjust decryption of the encrypted label instruction so that it yields the same result during execution regardless of which of the plurality of branch instructions is executed immediately before the label instruction.

In a fourth aspect, the invention is directed to a device for decryption of a set of compiled computer code instructions encrypted using a chained encryption function. The device comprises a processor adapted, during execution of the compiled computer code instructions, to: obtain a compensator value for an executed function; obtain a subsequent encrypted function, the subsequent encrypted function following the executed function during the execution of the compiled computer code instructions; obtain a pseudo-random number for the subsequent encrypted function; and decrypt the subsequent encrypted instruction using a decryption function corresponding to the chained encryption function, the decryption function generating a subsequent function from at least the subsequent encrypted instruction, the executed function, the pseudo-random number, and the compensator value.

In a fifth aspect, the invention is directed to a digital support medium comprising computer code instructions that, when executed on a computer, perform the method according to the second aspect of the invention.

BRIEF DESCRIPTION OF THE DRAWINGS

Preferred features of the present invention will now be described, by way of non-limiting example, with reference to the accompanying drawings, in which.

PREFERRED EMBODIMENT OF THE INVENTION

The present invention proposes to protect software by encryption, and subsequently decryption, of compiled software code instructions. For the purposes of this description, a high-level code instruction, is composed of at least one of:
- a basic block, i.e. a set of machine-level instructions that are always executed in sequence. If the basic block comprises a jump or similar instruction, it is the last machine-level instruction. This is because the next machine-level instruction is usually decided when the code is executed.
- a label, which can be said to be the destination of a jump instruction. If a basic block comprises a label, it always appears as the first instruction.

Figure 1:
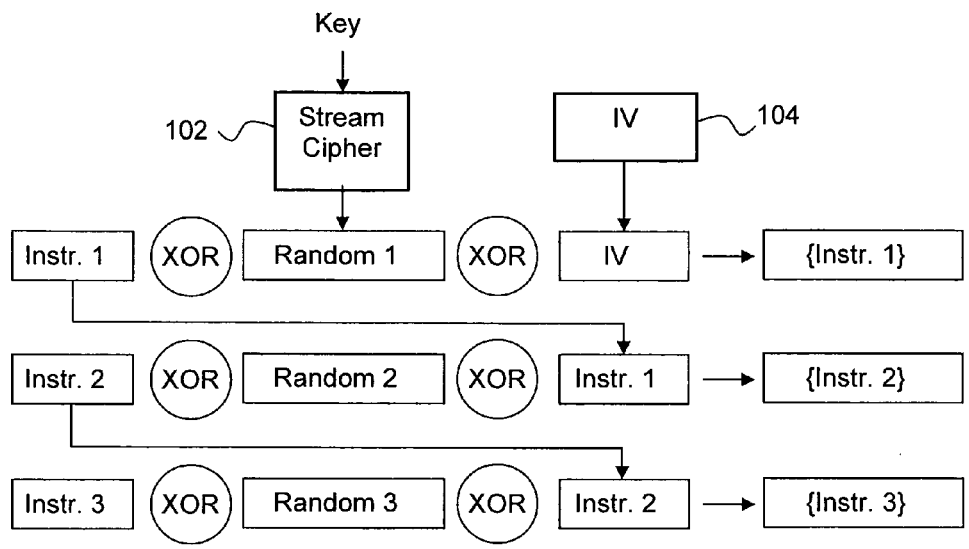
FIG. 1 illustrates a general chaining mode encryption scheme according to a preferred embodiment of the present invention.

FIG. 1 illustrates a general chaining mode encryption scheme according to a preferred embodiment of the present invention. An instruction is normally encrypted by XOR-ing it with a random number and the previous instruction. In the example given in FIG. 1, only three instructions are encrypted, but it will be understood that this can be generalised to a greater (or smaller) number.

The instructions to be encrypted—Instr 1, Instr 2, and Instr 3—appear in the first column from the left. The second column comprises pseudo-random numbers, which preferably are different for each instruction. The pseudo-random numbers are parts of a pseudo-random stream being provided by a stream cipher 102 using a secret key that preferably is unique to each compiled code. Stream ciphers are well known cryptographic primitives; RC4 and Salsa are two non-restrictive examples. Block ciphers can also be used in such a way that they act effectively as a stream cipher, like AES in counter mode (AES-CTR) for example.

The third column comprises the value of the previous unencrypted instruction, except for the first instruction that does not have a previous instruction, so an initialisation vector IV 104 is used instead. The fourth column comprises the resulting encrypted functions.

As can be seen, the first instruction is XOR-ed with the first pseudo-random number and the initialisation vector IV to produce a first encrypted instruction, {Instr. 1}. The second instruction, however, is encrypted by XOR-ing it with the second pseudo-random number and the first instruction to generate the second encrypted instruction, {Instr. 2}. Further instructions are encrypted in the same way, i.e. by XOR-ing with a pseudo-random number and the previous instruction.

The skilled person will appreciate that the chaining mode described in FIG. 1 works well for encryption of a basic block. However, it cannot be used beyond that, as it may happen that an instruction that can be reached from a plurality of places, e.g. by a jump, has a number of preceding instructions that are different from each other. This would usually result in a correct decryption in only one case, i.e. when the subsequent instruction is reached from the 'correct' preceding instruction.

The present invention, however, makes it possible to chain the entire code. To this end, at least some—possibly all— instructions are associated with a random number compensator that is used for the encryption and decryption of the following instruction. These random number compensators ensure that an instruction is correctly decrypted regardless of which the preceding instruction is, as will be described hereinafter. It should perhaps be pointed out for clarity that a random number compensator usually is not random, but a value that compensates a pseudo-random number.

Assume for example that an instruction $I_{14}$ has two possible preceding instructions, $I_{13}$ and $I_7$. Each preceding instruction is associated with a random number compensator, $C_{13}$ and $C_7$, respectively.

Without random number compensator, the encryption of instruction $I_{14}$ with a chaining from instruction $I_{13}$ gives:

$$\{I_{14}\}=I_{14}\oplus R_{14}\oplus I_{13},$$

where signifies an XOR operation and brackets an encrypted instruction.

Similarly, the encryption of instruction $I_{14}$ with a chaining from instruction $I_7$ gives:

$$\{I_{14}\}=I_{14}\oplus R_{14}\oplus I_7.$$

$\{I_{14}\}$ has then two possible values if $I_7$ and $I_{13}$ are different (which is often the case). To get the same encryption value for $\{I_{14}\}$, random number compensators, $C_{13}$ and $C_7$, are used. The equations become:

$$\{I_{14}\}=I_{14}\oplus R_{14}\oplus C_{13}\oplus I_{13}, \text{ and}$$

$$\{I_{14}\}=I_{14}\oplus R_{14}\oplus C_7\oplus I_7.$$

To ensure that the two equations yield the same result, the right-hand sides must be identical, i.e.:

$$I_{14}\oplus R_{14}\oplus C_{13}\oplus I_{13}=I_{14}\oplus R_{14}\oplus C_7\oplus I_7,$$

which can be reduced to $$C_{13}\oplus I_{13}=C_7\oplus I_7.$$

This means that the same encryption result is obtained if $C_{13}=C_7\oplus I_7\oplus I_{13}$.

The random number compensators are advantageously stored in a Random Correction Table (RCT) provided with the binary code, preferably encrypted in its header.

Figure 2:
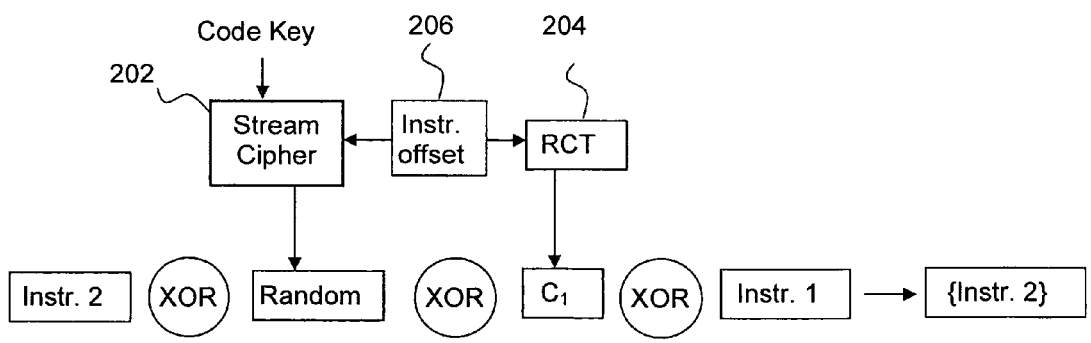
FIG. 2 illustrates in more detail how an instruction is encrypted according to a preferred method of the present invention.

Decryption of the code is preferably performed just before the execution of the code. A processor 420 is able to generate the right pseudo-random numbers to decrypt each instruction using the stream cipher 202 with the secret key as input. With the random number compensators, decrypting instruction $I_{14}$ from instruction $I_7$ gives:

$\{I_{14}\} \oplus R_{14} \oplus C_7 \oplus I_7 = I_{14} \oplus R_{14} \oplus C_7 \oplus I_7 \oplus R_{14} \oplus C_7 \oplus I_7 = I_{14}$, And from instruction $I_{13}$ gives:

$\{I_{14}\} \oplus R_{14} \oplus C_{13} \oplus I_{13} = \{I_{14}\} \oplus R_{14} \oplus C_7 \oplus I_7 \oplus I_{13} \oplus I_{13} = I_{14}$ The two equations thus yield the same decryption result: $I_{14}$ FIG. 2 illustrates in more detail how an instruction is encrypted according to a preferred method of the present invention. During compilation of the software code, the compiler provides information about the instructions that perform a jump. This information is used to encrypt the compiled code.

As in FIG. 1, an instruction, Instr. 2, is encrypted by XOR-ing it with the previous instruction, Instr. 1, and a pseudo-random number, which gives encrypted instruction {Instr. 2}.

However, FIG. 2 provides further details on the generation of the pseudo-random number. The pseudo-random number is generated by a stream cipher 202 (that, as in FIG. 1, preferably is RC4, Salsa or AES-CTR). As input, stream cipher 202 uses a code key and an instruction offset 206. RCT 204 also uses instruction offset 206 as input and provides a random number compensator $C_1$. If the encryption of Instr. 2 does not need a correction (this is case if Instr. 2 is not a label) then there will preferably be no information in the RCT 204 associated to the instruction offset 206.

The instruction offset 206 provides information to the stream cipher 202 to ensure that the same random number is generated for an instruction every time. The skilled person will appreciate that such an instruction offset was not needed in FIG. 1, as the code block was generated in a predefined sequence, whereas FIG. 2 allows jumps in the code; i.e. the n-th instruction to be executed is not necessarily the n-th instruction in the code.

It will be appreciated that it is possible to set the random number compensator of any jump instruction to zero and then iterate as needed to calculate the random number compensators of the instructions that should be corrected so as to enable full chaining of the code.

Figure 3:
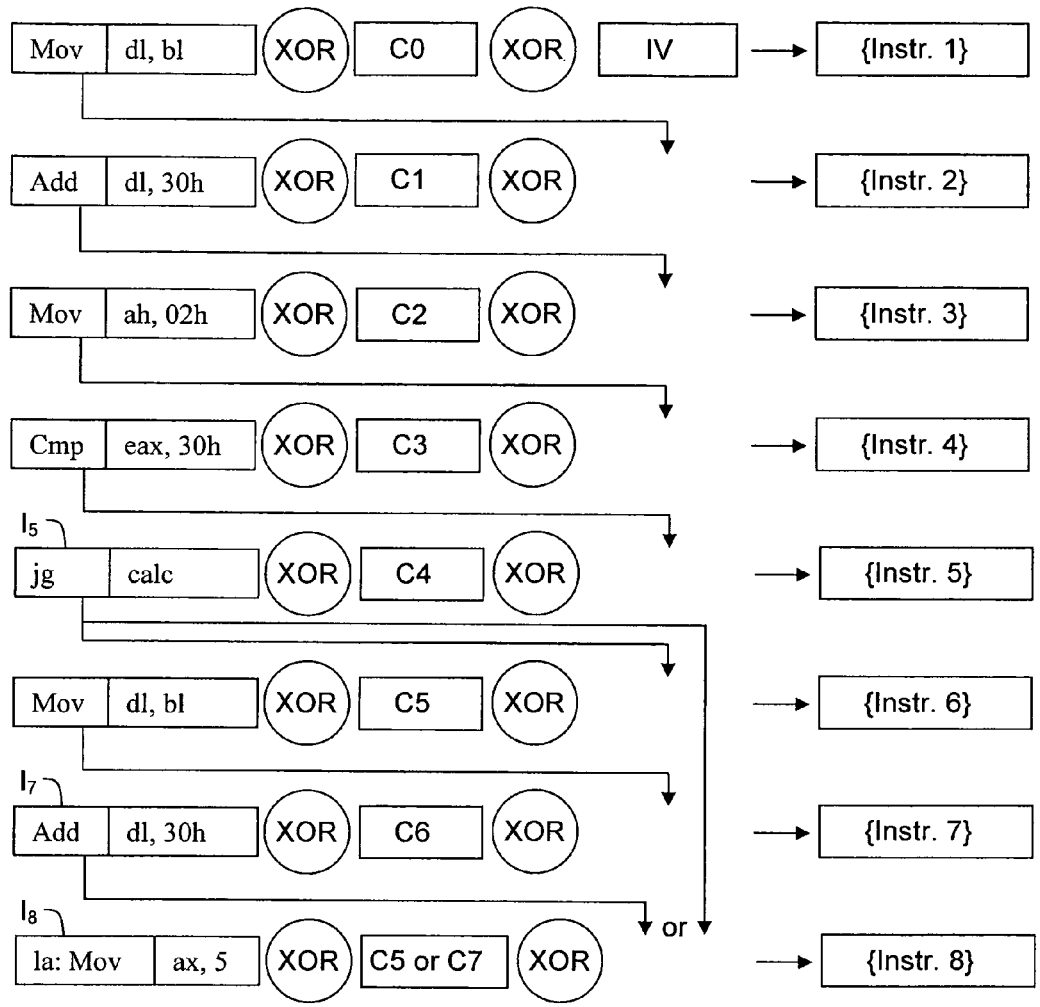
FIG. 3 illustrates an example of code with jumps encrypted using a preferred embodiment of the present invention.

FIG. 3 illustrates an example of code with jumps encrypted using a preferred embodiment of the present invention. As can be seen, the final instruction $I_8$ may be reached from two different instructions $I_5$, $I_7$. To make sure that the encrypted instruction {Instr. 8} is the same, regardless of the preceding instruction, it is made sure that $C_7 \oplus I_7 = C_5 \oplus I_5$. For reasons of simplicity, the random numbers $R_i$ used for encrypting the instructions are not shown in FIG. 3.

If $C_7$ is set, then $C_5$ is calculated as $C_7 \oplus I_7 \oplus I_5$. On the other hand, if $C_5$ is set, then $C_7$ is calculated as $C_5 \oplus I_7 \oplus I_5$. As already mentioned, it usually does not matter which random number compensator is set; what is important is that it is possible to decrypt the instruction arriving from every possible preceding instruction.

The values of the random modifiers are then stored in the RCT table described hereinbefore.

Figure 4:
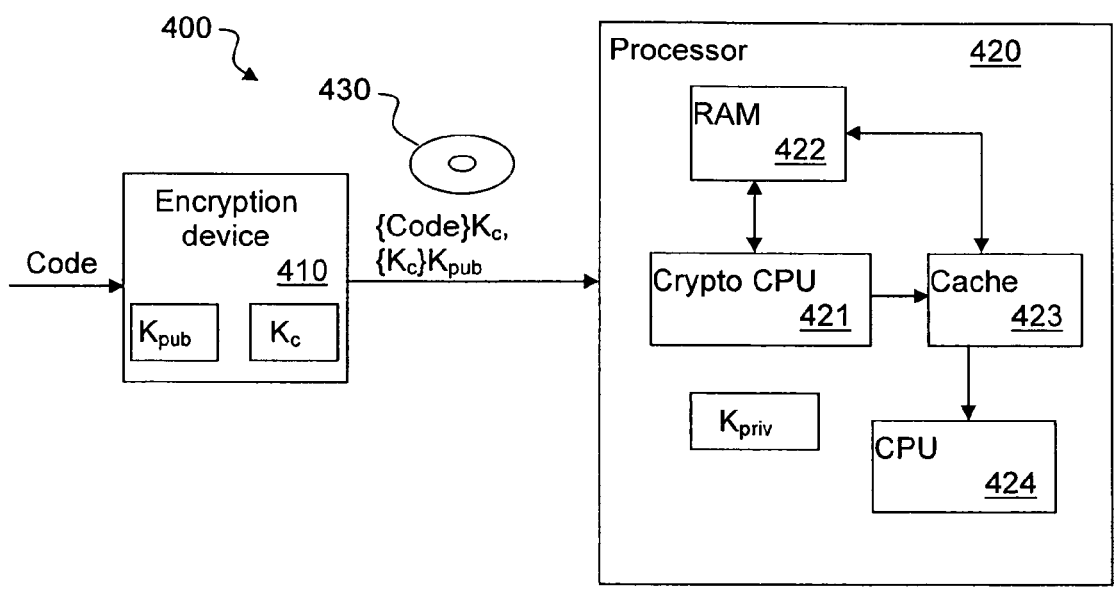
FIG. 4 illustrates a system for code encryption and decryption according to a preferred embodiment of the present invention

FIG. 4 illustrates a system 400 for code encryption and decryption according to a preferred embodiment of the present invention. The system 400 comprises an encryption device 410 adapted to receive and encrypt compiled binary code "Code". The encryption device 410 is adapted to scramble the binary code as described hereinbefore. The encryption device 410 stores a public key $K_{pub}$ of a processor 420 for which the scrambled code $\{Code\}K_c$ is intended, and generates a secret code key $K_c$ that preferably changes every time (i.e. is different from one code to another). The public key $K_{pub}$ may be unique for the intended device or a number of devices. The secret key $K_c$ is used by the stream cipher to generate the random stream. In order to securely transmit the secret key $K_c$, it is encrypted using the public key $K_{pub}$, which results in an encrypted secret key, $\{K_c\}K_{pub}$. $\{K_c\}K_{pub}$ is provided with the binary code, preferably in its header.

The encryption device 410 may be implemented in one or more processors (not shown; hereinafter "processor") or part of a greater device that may also include a compiler adapted to compile the code and that further comprises at least one communication unit and one memory. The encryption device 410 is adapted to analyse the compiled code to find the information necessary, e.g. labels, to effectuate the encryption.

The encryption device 410 is further adapted to send the scrambled code $\{Code\}K_c$ and the encrypted secret key $\{K_c\}K_{pub}$ to the processor 420, either through the same channel or through separate channels. It will be appreciated that the scrambled code $\{Code\}K_c$ may be distributed, with or without the encrypted secret key $\{K_c\}K_{pub}$, on a digital support medium 430, such as for example a CD-ROM, or any suitable digital distribution network (e.g. Internet, LAN, UMTS).

The processor 420 extracts from the binary code header the encrypted secret key $\{K_c\}K_{pub}$. The processor 420 preferably comprises a crypto-processor 421 adapted decrypt $\{K_c\}K_{pub}$ using a private key $K_{priv}$ corresponding to the public key. The private key $K_{priv}$ is preferably stored in a secure (tamper-proof) location. The crypto-processor is also adapted to descramble the scrambled code $\{Code\}K_c$ using the secret key $K_c$ to obtain the binary code that, as the instructions are descrambled, are forwarded to a cache 423 from where they are further delivered to a second processor (CPU) 424 for execution. The processor 420 further comprises a memory (RAM) 422 adapted to store the RCT.

While the system and method may be implemented using an ordinary processor, it will be appreciated that it is advantageous to use a so-called crypto-processor, as it is more secure.

In the description hereinbefore, it has been mentioned that instructions are encrypted. As the skilled person will appreciate that the length of an instruction may vary depending on the number of variables associated with the so-called opcode. According to a first variant, only the opcode of each instruction is encrypted and leave the variables unencrypted.

According to a second variant, the pseudo-random number used for encryption is as long as the length of the longest instruction. If so, the opcode is decrypted first, so as to acquire knowledge about the variables length linked to the opcode. Then, in a second pass, the variables are decrypted. To chain instructions using the second variant, the previous instruction is truncated to the length of the present instruction, the previous instruction is longer, but no truncation is needed if the previous instruction is shorter (or of equal length).

The skilled person will appreciate that it is possible to associate the pseudo-random number used for encryption of an instruction with the instruction itself or with the preceding instruction, if only the random number compensator is calculated so as to obtain the same decrypted value regardless of which instruction is executed prior to the instruction in question.

Each feature disclosed in the description and (where appropriate) the claims and drawings may be provided independently or in any appropriate combination. Features described as being implemented in hardware may also be implemented in software, and vice versa.

Reference numerals appearing in the claims are by way of illustration only and shall have no limiting effect on the scope of the claims.

The invention claimed is:

1. A method of encrypting a set of compiled computer code instructions so as to obtain an encrypted set of compiled computer code instructions intended to be decrypted instruction by instruction during execution, the set of compiled computer code instructions comprising a plurality of branch instructions and a label instruction, wherein execution of the set of compiled computer code instructions may continue from each of the plurality of branch instructions directly to the label instruction, the method comprising the steps at a device of:

encrypting the label instruction using a chained encryption function so that the encrypted label instruction depends on at least the values of the label instruction and the value of a chosen one of the plurality of branch instructions; and associating each of the at least one branch instruction other than the chosen one of the plurality of branch instructions with a compensator value to be used to adjust decryption of the encrypted label instruction so that it yields the same result during execution regardless of which of the plurality of branch instructions is executed immediately before the label instruction.

2. The method of claim 1, wherein the encryption of the label instruction is further dependent on a pseudo-random random number associated with the label instruction.

3. The method of claim 2, further comprising the step of generating the pseudo-random number as a function of a code key and an offset of the instruction for which the pseudo-random number is generated.

4. The method of claim 1, wherein the values of the label instruction and of the chosen one of the plurality of branch instructions are the values of the respective opcode parts.

5. The method of claim 1, wherein the encryption is performed by XOR-ing the values of the label instruction and the value of a chosen one of the plurality of branch instructions.

6. A method of decrypting a set of compiled computer code instructions encrypted using a chained encryption function, the method comprising, during execution of the compiled computer code instructions, the steps at a device of:

obtaining a compensator value for an executed function;

obtaining a subsequent encrypted function, the subsequent encrypted function following the executed function during the execution of the compiled computer code instructions;

obtaining a pseudo-random number for the subsequent encrypted function; and decrypting the subsequent encrypted instruction using a decryption function corresponding to the chained encryption function, the decryption function generating a subsequent function from at least the subsequent encrypted instruction, the executed function, the pseudo-random number, and the compensator value.

7. The method of claim 6, further comprising the step of generating the pseudo-random number as a function of a code key and an offset of the subsequent encrypted function.

8. The method of claim 6, wherein an encrypted function comprises an encrypted opcode and unencrypted parameters, if any, and wherein only the opcode parts of the executed function and the subsequent encrypted function are used for the decryption.

9. The method of claim 6, wherein the decryption is performed by XOR-ing the values of the subsequent encrypted instruction, the executed function, the pseudo-random number, and the compensator value.

10. A non-transitory digital support medium comprising computer code instructions that, when executed on a computer, perform the method according to claim 6.

11. A device for encryption of a set of compiled computer code instructions so as to obtain an encrypted set of compiled computer code instructions intended to be decrypted instruction by instruction during execution, the set of compiled computer code instructions comprising a plurality of branch instructions and a label instruction, wherein execution of the set of compiled computer code instructions may continue from each of the plurality of branch instructions directly to the label instruction, the device comprising a processor adapted to:

encrypt the label instruction using a chained encryption function so that the encrypted label instruction depends on at least the values of the label instruction and the value of a chosen one of the plurality of branch instructions; and associate each of the at least one branch instruction other than the chosen one of the plurality of branch instructions with a compensator value to be used to adjust decryption of the encrypted label instruction so that it yields the same result during execution regardless of which of the plurality of branch instructions is executed immediately before the label instruction.

12. A device for decryption of a set of compiled computer code instructions encrypted using a chained encryption function, the device comprising a processor adapted, during execution of the compiled computer code instructions to:

obtain a compensator value for an executed function;

obtain a subsequent encrypted function, the subsequent encrypted function following the executed function during the execution of the compiled computer code instructions;

obtain a pseudo-random number for the subsequent encrypted function; and decrypt the subsequent encrypted instruction using a decryption function corresponding to the chained encryption function, the decryption function generating a subsequent function from at least the subsequent encrypted instruction, the executed function, the pseudo-random number, and the compensator value.

* * * * *